United States Patent Office 3,646,237
Patented Feb. 29, 1972

3,646,237
PROCESS FOR RECOVERING ISOBUTYLENE
Tatsuo Horie and Shigeyuki Hayashi, Tokyo, Japan, assignors to Nippon Oil Company, Limited, Minato-ku, Tokyo, Japan
No Drawing. Filed Aug. 28, 1969, Ser. No. 853,935
Claims priority, application Japan, Sept. 7, 1968, 43/64,170
Int. Cl. C07c *11/02*
U.S. Cl. 260—677 A
6 Claims

ABSTRACT OF THE DISCLOSURE

A process for recovering highly purified isobutylene comprising contacting an isobutylene-containing hydrocarbon mixture with an aqueous solution which is acidified with hydrochloric acid and containing a chloride of a metal selected from the group consisting of zinc, tin, antimony and bismuth to allow the isobutylene to be absorbed in the form of tert-butyl alcohol in the aqueous solution; removing unreacted hydrocarbons from said solution; subjecting the solution to degassing treatment; and subjecting them to dehydrating treatment; in which the present invention is characterized in said degassing treatment.

---

This invention relates to a novel process for purifying crude isobutylene and recovering a highly purified isobutylene. More particularly, it relates to a process for recovering a highly purified isobutylene comprising contacting an isobutylene-containing hydrocarbon mixture with an aqueous solution which is acidified with hydrochloric acid and containing a chloride of a metal selected from the group consisting of zinc, tin, antimony and bismuth, to allow the isobutylene to be absorbed in the form of tert-butyl alcohol in said aqueous solution; removing unreacted hydrocarbons of the mixture from the tert-butyl alcohol-containing aqueous solution; and subjecting said solution to degassing treatment and then to dehydrating treatment; in which the process being characterized by heating the tert-butyl alcohol-containing aqueous solution to 60°–75° C., immediately followed by flashing it in a flashing drum to withdraw thus-produced gaseous substances at the top of the drum and thus-degassed alcohol-containing aqueous solution at the bottom thereof.

There have been known the Esso process using a 65% solution of sulfuric acid and the CFR-Badger process using a 50% solution of sulfuric acid, by which isobutylene may be separated and recovered from an isobutylene-containing hydrocarbon mixture such as a mixture of $C_4$ hydrocarbons obtained as by-products when petroleum is cracked to produce olefins.

According to the information on these known processes, the purity of isobutylene which may be obtained by them, is approximately 99.0%, and the recovery rate thereof is less than 90%, which is their disadvantage, because sulfuric acid is used as a liquid extractor in said processes and thereby a part of the isobutylene is inevitably polymerized.

This invention relates to a process for recovering a highly purified isobutylene in a high yield, characterized by using an aqueous solution as a liquid catalyst which is acidified with hydrochloric acid, and containing a chloride of a certain metal instead of using sulfuric acid.

The present inventors and their co-workers have found processes for recovering a highly purified isobutylene which comprise contacting and reacting an acidified aqueous solution containing the chlorides of zinc, tin, antimony or bismuth, with hydrocarbons containing isobutylenes to selectively absorb the isobutylene in the form of tert-butyl alcohol produced by the reaction and at the same time to separate the alcohol-containing aqueous solution from the unreacted hydrocarbons, degassing the alcohol-containing solution by heating and then dehydrating the alcohol to obtain a highly purified isobutylene in a high yield as described in British Pat. No. 1,113,390 or U.S. Pat. No. 3,397,250.

These processes are very superior to the conventional ones for recovering isobutylene by separation, while they have been found to have a disadvantage that some amount of an oligomer os isobutylene is still produced in their degassing step wherein the degassing is effected only by heating and agitating the tert-butyl alcohol-containing material, thereby decreasing the yield (recovery) of isobutylene and possibly causing some trouble with the apparatus when operated for a long period of time.

After the studies made in an attempt to overcome said disadvantage, there has been discovered a superior step of degassing by heating to 60°–75° C. an aqueous metallic chloride solution acidified with hydrochloric acid and containing tert-butyl alcohol, immediately followed by flashing the solution in a flashing drum to withdraw thus-evolved gaseous substances at the top of the drum. This invention has been accomplished based upon this discovery.

The process of this invention will be more particularly described hereunder.

Firstly, an aqueous solution, acidified with hydrochloric acid and containing a chloride of a metal selected from the group consisting of zinc, tin, antimony and bismuth (the solution being hereinafter referred to as "catalytic solution"), is contacted with an isobutylene-containing mixture of hydrocarbons to allow the isobutylene to be selectively absorbed in the form of tert-butyl alcohol in the catalytic solution. The catalytic solution mentioned above may usually be prepared either by dissolving said metallic chloride in hydrochloric acid or by dissolving said metallic chloride and hydrogen chloride in water, the hydrogen chloride possibly being obtained from a compound which is capable of substantially producing hydrochloric acid when added into water. A high concentration of the metallic chloride in the catalytic solution will cause polymerization of isobutylene, while that of the hydrochloric acid will increase the yield of chlorides as by-products. In addition, low concentrations of the metallic chloride and hydrochloric acid will retard the rate at which the isobutylene is hydrated into tert-butyl alcohol which is absorbable in the catalytic solution.

It is desirable that the catalytic solution consists of 6.0–14.0 mol percent of the metallic chloride, 4.0–11.0 mol percent of hydrochloric acid and 80.0–86.0 mol percent of water to inhibit the side-reactions such as polymerization of isobutylene, addition reaction of hydrogen chloride and the like, and to ensure a satisfactorily high rate of reaction as an individually usable catalyst. The solution may also contain metallic ions having higher oxidation potential to stabilize the solution. More particularly, the solution may contain metallic ions, such as $Fe^{+++}$, $Cu^{++}$, $Co^{+++}$, $Pd^{++}$, $Au^{+++}$, $Ti^{++++}$, $Se^{++++}$ and the like at a concentration from 10 to 100 millimols per litre of said catalytic solution, which have higher oxidation potential than those produced by dissociating said metallic chloride in the catalytic solution.

A hydrocarbon mixture containing isobutylene, which may be used in this invention, includes $C_4$ hydrocarbons obtained as by-products from thermal or catalytic cracking of petroleum, natural gas or the like and also includes an isobutylene-containing hydrocarbon mixture obtained from dehydrogenation of lower hydrocarbons, and the like. These starting isobutylene-containing hydrocarbon mixtures are preferably freed of the hydrocarbons which are higher and lower than the $C_4$ hydrocarbons by means of distillation before their use. Hydrocarbons, such as butadiene and acetylene, present in the mixture are essentially not nuisances; however, it is preferable to remove them from the mixture by means of extraction, selective hydrogenation or the like, before the use of the mixture.

In the practice of this invention, the reaction caused is a hydrating reaction by which the isobutylene is selectively converted into tert-butyl alcohol. The starting hydrocarbon mixture may be contacted with the catalytic solution in either gaseous state or liquid state; and the contact in the latter state is preferable because of obtaining tert-butyl alcohol in a higher yield, from the industrial point of view. Although the contact may be effected by any method in which an intimate and uniform contact is ensured thereby, it is usually conveniently effected by agitation with an ordinary agitator or circulating agitation. The reaction temperature may be from 0° to 60° C., preferably be from 20° to 45° C. and the reaction pressure may be 0–10 atm. g. (atmospheric pressure by gauge). The reaction can be carried out either batchwise or continuously. The contact time varies with the desired yield or recovery ratio of isobutylene, concentration of isobutylene in the starting hydrocarbon mixture, composition of the catalytic solution, ratio by volume between the starting hydrocarbon mixture and catalytic solution, and the like; it usually varies from several minutes to several hours.

After the end of the reaction, the reaction mixture is freed of the unreacted hydrocarbons. If the starting hydrocarbon mixture is used in the liquid state, the unreacted hydrocarbons which form the upper layer, will be separated from the tert-butyl alcohol-containing catalytic solution of the lower layer, by allowing the reaction mixture to stand still.

The alcohol-containing catalytic solution is then subjected to degassing treatment. This degassing treatment is the characteristic of this invention. More particularly, this degassing treatment is achieved by heating the alcohol-containing catalytic solution to 60°–75° C. immediately followed by flashing the heated solution in the flashing drum to withdraw gaseous substances at the top thereof and discharge thus-degassed solution at the bottom thereof.

The reason why a highly pure isobutylene can be recovered by using such degassing step in the process of this invention, is hereinafter mentioned.

As previously mentioned, the isobutylene-containing hydrocarbon mixture is contacted with the catalytic solution to hydrate the isobutylene, and the resulting mixture is then allowed to stand still to separate the unreacted hydrocarbons from the catalytic solution containing tert-butyl alcohol. In this hydrating step, it is impossible to prevent unreacted hydrocarbon mixture such as a mixture of butene-1, butene-2, isobutene, n-butane and the like from physically dissolving in the catalytic solution. These hydrocarbons tend to dissolve in a larger amount in the alcohol-containing catalytic solution than in a solution, acidified with hydrochloric acid, of the metallic chloride. The unreacted hydrocarbons physically dissolved in the catalytic solution will be liberated therefrom and incorporated, as impurities, into product isobutylene recovered be dehydrating the tert-butyl alcohol when the alcohol-containing solution is subjected to dehydrating treatment, thereby decreasing the purity of the product isobutylene. This is undesirable. Although the unreacted hydrocarbons physically dissolved and then liberated as impurities into the product isobutylene, are small in quantity, they cannot be ignored if the product isobutylene contaminated therewith is employed as monomers for polymerization. Therefore, the unreacted hydrocarbons physically dissolved in the catalytic solution must be removed therefrom in order to recover isobutylene in the highly pure form.

There have been known processes for removing these physically dissolved hydrocarbons, such as a process for removing by extraction with a suitable solvent, a process for removing by distillation under reduced pressure, a process for removing by stripping with an inert gas blown, and the like. The known processes are, however, not satisfactory in the removal of these unreacted hydrocarbons physically dissolved in the present case and they will economically not be superior if used for industrial purification of crude isobutylene and recovery of the highly purified isobutylene.

It has been found by the inventors that such physically dissolved unreacted hydrocarbons can be removed by means of degassing treatment. It has further been discovered that the degassing treatment is extremely effectively achieved by performing the flashing operation. This discovery is the one upon which this invention is based. The flashing according to this invention is effected by heating a catalytic solution containing tert-butyl alcohol to 60°–75° C. and soon thereafter flashing the heated solution in a flashing drum to discharge gaseous substances at the upper part of the drum and withdraw thus-degassed solution at the lower part thereof.

In this flashing step, a part of the tert-butyl alcohol is dehydrated to produce gaseous isobutylene which is very effective in the stripping of the unreacted hydrocarbons dissolved in the catalytic solution, thereby removing substantially all of the dissolved hydrocarbons from the solution without forming substantially any oligomer of isobutylene.

If the temperature of the catalytic solution introduced into the flashing drum is lower than 60° C., degassing is not carried out effectively. In this case, it is thought that tert-butyl alchol will not sufficiently be dehydrated and it results in an unsatisfactory stripping.

If, on the other hand, the temperature is higher than 75° C., an improvement in stripping effect will be made while isobutylene to be recovered will decrease in yield and oligomer formed will increase in amount. In the present invention, it is preferable that from 1 to 20% of tert-butyl chloride in said catalytic solution is dehydrated in this degassing treatment.

The catalytic solution should therefore be at a temperature between 60° and 75° C.

It is necessary that the catalytic solution should be introduced into a flashing drum immediately after heated to a temperature of 60°–75° C. This introduction soon following the heating means that the catalytic solution should be introduced into the flashing drum as soon as possible after heated to the desired temperature. If the solution is kept unnecessarily long at this temperature before its introduction into the tank, this will not have any favorable effect on the flashing and will further be the cause for increasing the formation of oligomer of isobutylene.

To avoid these disadvantages, there is employed a heating method in which a tube having a relatively small diameter is externally heated while causing to pass the catalytic solution therethrough, or a method in which heat exchangers are used.

The flashing drum in accordance with this invention, which has a substantially hollow body, is provided with a device for introducing the catalytic solution at the middle portion thereof, a device for withdrawing gases at the upper portion thereof and a device for discharging the degassed solution at the lower portion thereof.

It is preferable that the discharging device includes one to prevent entrainment of the catalytic solution.

On one hand, the gases evolved by flashing according to this invention are withdrawn at the gas outlet of the flashing drum. These gases, which comprise hydrocarbons, may be used as part of the starting material for recycling to the hydrating step because of their relatively high content of isobutylene although they may also be discharged out of the system. On the other hand, the catalytic solution, which is degassed by flashing according to this invention and retains the tert-butyl alcohol substantially without the unreacted hydrocarbons physically dissolved therein, is withdrawn at the solution outlet of the flashing drum and then passed to the dehydrating step in which it is heated for dehydration. One of the characteristics of this invention is that the tert-butyl alcohol can be dehydrated only by heating the catalytic solution containing the alcohol, thereby obtaining a highly pure isobutylene in a high yield.

A catalytic solution used in the process of this invention is catalytically effective not only in hydrating reaction by which isobutylene can selectively be hydrated to tert-butyl alcohol, but also in dehydrating reaction by which the tert-butyl alcohol is dehydrated to isobutylene when heated.

The temperature to which the alcohol-containing catalytic solution is heated, is preferably between 80° C. and 140° C. If the solution is heated to less than 80° C., the tert-butyl alcohol contained therein will not effectively be dehydrated to isobutylene, while if heated to more than 140° C. the formation of oligomer of the isobutylene produced will sharply be increased.

This dehydrating treatment may usually be effected in a tower, a tank fitted with a heating and an agitating device, or the like. In any one of these vessels, a highly pure isobutylene can be obtained by the dehydration of the tert-butyl alcohol. The catalytic solution from which the isobutylene has been distilled off, may be recycled to the hydrating step for a new hydration.

This invention will be more concretely explained and better understood by the following examples.

EXAMPLE 1

A catalytic solution was prepared by dissolving antimony trichloride in hydrochloric acid so as to obtain a solution containing 4.0 mol/l. of antimony trichloride and 4.0 mol/l. of hydrogen chloride.

Into a 10 litre pressure-proof reactor fitted with an agitator was introduced 3.0 litres of the catalytic solution and then 3.0 litres of a mixture of hydrocarbons in the liquid form, the mixture being obtained by thermal cracking of naphtha and containing $C_4$ distillates consisting of 44.9% by weight of isobutylene, 1.9% by weight of isobutane, 9.0% by weight of n-butane, 10.0% by weight of trans-butene-2, 7.8% by weight of cis-butene-2, 25.2% by weight of butene-1 and 0.7% by weight of 1,3-butadiene, together with 0.5% by weight of $C_5$ distillates, based on the weight of the mixture.

The contents of the reactor were then agitated at a temperature of 38° C. for 40 minutes to effect a hydration reaction. After the reaction, the reaction mixture was allowed to stand still to separate the unreacted hydrocarbons as the upper layer from the tert-butyl alcohol-containing catalytic solution as the lower layer. This catalytic solution was withdrawn from the reactor and passed through a titanium-made tube externally heated at a temperature of 70° C., to a 10 litre flashing drum for degassing. Thus, gaseous isobutylene of 88.7% in purity was withdrawn at the top of the flashing drum. This isobutylene withdrawn amounted to 6.9% of the isobutylene previously absorbed in the catalytic solution in the hydrating step.

The catalytic solution so flashed was then withdrawn at the bottom of the flashing drum and then sent to a dehydrating tower which, in this case, was made of titanium, was 25 cm. in diameter and has 60 perforated plates. The dehydrating tower was maintained at −5° C. at the top thereof and at approximately 120° C. at the bottom thereof and fed with the flashed catalytic solution in 60 minutes. The distillate from the top of the tower contained 99.96% by weight of isobutylene with respect to the hydrocarbons in the distillate, and the isobutylene recovered amounted to 99.5% by weight of the tert-butyl alcohol fed into the dehydrating tower.

EXAMPLES 2–3

The procedure of Example 1 was followed, but substituting stannous chloride in Example 2, and bismuth trichloride in Example 3 for antimony trichloride.

As is seen from the following table, the isobutylene recovered in each of Examples 2 and 3 was as highly pure as that in Example 1.

| Example | Example 2 | Example 3 |
|---|---|---|
| Composition of catalytic solution. | Stannous chloride 5.6 mol/l., hydrogen chloride 5.0 mol/l. | Bismuth trichloride 6.0 mol percent, hydrogen chloride 10.0 mol percent, water, 84.0 mol percent. |
| Purity of isobutylene recovered. | 99.90 wt. percent | 99.91 wt. percent. |

EXAMPLE 4

A catalytic solution was prepared by introducing zinc chloride and hydrogen chloride into pure water so as to obtain a solution containing 4.5 mol/l. of zinc chloride and 4.5 ml./l. of hydrogen chloride. Ferric chloride was added to the catalytic solution so as to contain 20 mmol of $Fe^{+++}$ per liter of the catalytic solution. A 0.7 m.$^3$ (inner volume) titanium-made reactor fitted with a stirrer, was charged with 0.2 m.$^3$/hr. of the catalytic solution and with 0.2 m.$^3$/hr. of a liquid mixture of hydrocarbons, the mixture containing isobutylene and having the same composition as in Example 1, and the reaction temperature was kept at 30° C.

The reaction mixture thus obtained was discharged from the reactor and then introduced into a 0.3 m.$^3$ settling tank where the mixture was allowed to stand still. The catalytic solution containing tert-butyl alcohol was discharged at the lower part of the settling tank and then passed through a heat exchanger where the solution was heated to 69° C., to a 0.3 m.$^3$ flashing drum for degassing. Gaseous isobutylene of 85% in purity was withdrawn at the top of the flashing drum in an amount of 2.3 m.$^3$ hr. and it was allowed to cycle to the hydrating reactor. The catalytic solution containing tert-butyl alcohol, which was continuously discharged at the bottom of the flashing drum, was fed into a dehydrating tower having a 0.2 m. diameter and 30 perforated plates. The dehydrating tower was maintained at a temperature of 115°–120° C. at the bottom thereof.

The distillate from the top of the tower was contained 99.9% by weight of isobutylene with respect to the hydrocarbons present therein.

In addition, the catalytic solution from the bottom of the dehydrating tower was recycled for reuse and found to have been catalytically effective without producing by-products and other deposits or precipitates which were likely to hinder the dehydrating reaction.

The foregoing results show that the process of this invention is the superior one for recovering a highly pure isobutylene from a mixture of hydrocarbons containing isobutylene.

What is claimed is:

1. In a process for obtaining a highly pure isobutylene by contacting an aqueous solution which is acidified with hydrochloric acid and containing at least one chloride of a metal selected from the group consisting of zinc, tin, antimony and bismuth, with an isobutylene-containing mixture at a temperature from 0° to 60° C. to selectively absorb the isobutylene in the form of tert-butyl alcohol in the aqueous solution thereby separating isobutylene from unreacted hydrocarbons of the mixture, degassing the aqueous solution containing tert-butyl alcohol and then dehydrating the degassed aqueous solution to obtain highly pure isobutylene, the improvement which comprises, as the degassing step, heating the aqueous solution containing tert-butyl alcohol to 60°–75° C. and then immediately introducing the heated solution into a flashing drum for degassing, withdrawing thus produced gaseous substances at the top of said drum and discharging thus flashed aqueous solution containing tert-butyl alcohol at the bottom thereof.

2. A process according to claim 1 wherein said aqueous solution contains metallic ions having higher oxidation potential than zinc, tin, antimony or bismuth at a concentration from 10 to 100 millimols per litre of said aqueous solution.

3. A process according to claim 1 wherein said isobutylene containing mixture of hydrocarbons is a $C_4$ fraction from thermal or catalytic cracking of hydrocarbons.

4. A process according to claim 1 wherein the dehydration is carried out by heating the degassed aqueous solution at a temperature from 80° C. to 140° C.

5. A process according to claim 1 wherein the flashing drum for degassing is a hollow body having a device for charging the aqueous solution containing tert-butyl alcohol, a device for discharging gases at the upper portion and a device for discharging the degassed aqueous solution.

6. A process according to claim 1 wherein said aqueous solution consists essentially of 6.0 to 14.0 mol percent of metal chloride, 4.0 to 11.0 mol percent of hydrogen chloride and 80.0 to 86.0 mol percent of water.

References Cited
UNITED STATES PATENTS

| 3,397,250 | 8/1968  | Nambu           | 260—677 |
| 2,303,362 | 12/1942 | Jessup et al.   | 260—683 |
| 2,491,786 | 12/1949 | Weinrich        | 260—677 |
| 3,280,208 | 10/1966 | Turnquest et al.| 260—677 |
| 2,107,515 | 3/1938  | Bent            | 260—156 |
| 2,156,070 | 4/1939  | Stern           | 260—663 |

DELBERT E. GANTZ, Primary Examiner

J. M. NELSON, Assistant Examiner

U.S. Cl. X.R.

260—654